United States Patent
Favero

(10) Patent No.: US 10,647,908 B2
(45) Date of Patent: May 12, 2020

(54) COMPOSITION FOR OIL AND GAS RECOVERY

(71) Applicant: S.P.C.M. SA, Andrezieux Boutheon (FR)

(72) Inventor: Cédrick Favero, Andrezieux Boutheon (FR)

(73) Assignee: S.P.C.M. SA, Andrezieux Boutheon (FR)

(*) Notice: Subject to any disclaimer, the term of this patent is extended or adjusted under 35 U.S.C. 154(b) by 0 days.

(21) Appl. No.: 16/523,599

(22) Filed: Jul. 26, 2019

(65) Prior Publication Data

US 2019/0345373 A1 Nov. 14, 2019

(51) Int. Cl.
| C09K 8/588 | (2006.01) |
| C09K 8/64 | (2006.01) |
| E21B 43/16 | (2006.01) |
| E21B 43/26 | (2006.01) |
| C09K 8/80 | (2006.01) |
| E21B 43/22 | (2006.01) |

(52) U.S. Cl.
CPC ............... *C09K 8/588* (2013.01); *C09K 8/64* (2013.01); *C09K 8/80* (2013.01); *E21B 43/16* (2013.01); *E21B 43/26* (2013.01)

(58) Field of Classification Search
CPC ...... C09K 8/588; C09K 2208/28; C09K 8/68; E21B 43/26; E21B 43/16; E21B 43/20
See application file for complete search history.

(56) References Cited

U.S. PATENT DOCUMENTS

| 8,186,871 | B2 | 5/2012 | Pich et al. | |
| 2013/0072405 | A1* | 3/2013 | Favero | C09K 8/12 507/225 |

FOREIGN PATENT DOCUMENTS

| WO | 2017/187150 A1 | 11/2017 |
| WO | 2018/172676 A1 | 9/2018 |

* cited by examiner

*Primary Examiner* — Zakiya W Bates
(74) *Attorney, Agent, or Firm* — Heslin Rothenberg Farley & Mesiti P.C.

(57) ABSTRACT

Provided is a composition for preparing injection fluid in oil and gas recovery comprising an inverse emulsion of a water-soluble polymer A comprising acrylamide monomer units, and solid particles of a water-soluble polymer, wherein water-soluble polymer B is obtained by a polymerization step of at least acrylamide and 1 and 15 mol % of acrylamido tertiary butyl sulfonic acid (ATBS), and/or salts thereof, and a subsequent post treatment step of the resulting polymer. Also provided is a method of treating a portion of subterranean formation comprising providing the composition, preparing an injection fluid with at least the composition, introducing the injection fluid into portion of the subterranean formation. The composition is particularly useful to prepare fracturing fluid in fracturing operations.

30 Claims, 1 Drawing Sheet

COMPOSITION FOR OIL AND GAS RECOVERY

FIELD OF THE INVENTION

The present invention relates to a new composition comprising water soluble polymers for treating a portion of a subterranean formation. The present invention also refers to a method for treating a portion of a subterranean formation and especially to a method for recovering oil and gas, wherein the composition is used. The composition is particularly useful to prepare fracturing fluid in fracturing operations, and injection fluid in Chemical Enhanced Oil Recovery (EOR).

BACKGROUND

Water-soluble polymers are widely used in oil and gas recovery processes, such as enhanced oil recovery and hydraulic fracturing operations, but also other stimulation, cementing, drilling operations or completion operations. Water-soluble polymers are generally in solution form, in inverse emulsion form, in powder form, or in dispersion form. Each of them has known advantages and drawbacks.

In the oil and gas industry, there is generally a need for highly concentrated version of polymer composition, easily useable, and hence preferably in liquid form. The document WO2017/187150 proposes a formulation prepared by mixing a granulated water-soluble friction reducing polymer with an inverse polymer emulsion. This offers a liquid composition that does not require specialized equipment and which is found to be technically advantageous and cost-effective. More precisely, the composition affords friction reducing performances that matches or surpasses previous friction reducers. The level of friction reduction is higher and reached faster.

In oil and gas operations, fluids that are injected into a subterranean formation may comprise particles or colloids. In that case, the particles or colloids have to be suspended in the fluid in order to avoid any sedimentation and inhomogeneity of the dispersed particles. Viscosifying polymers are generally used for that purpose in injection fluid compositions. However, the injection fluid composition is generally exposed to high shear conditions and the viscosifying polymers which are generally shear thinning do not afford satisfactory results.

There is a need to improve the viscosity and/or the suspensive effect(s) of water-soluble polymers used in oil and gas recovery processes, especially when high shear conditions are encountered.

In fracturing operation, especially when High Viscosity Friction Reducers (HVFR) are used, the dosage of said HVFR is important and there is a need to improve their efficiency at same dosage, or to have the same efficiency at lower dosage.

The applicant has developed a new composition made with a combination of specific water-soluble polymers and that offers solutions to the problem above described.

SUMMARY OF THE INVENTION

In a first aspect, the present invention provides a composition for preparing an injection fluid in oil and gas recovery comprising:
An inverse emulsion of a water-soluble polymer A comprising acrylamide monomer units, and
Solid particles of a water-soluble polymer B,
wherein the water-soluble polymer B is obtained by a polymerization step of at least acrylamide and 1 and 15 mol % of acrylamido tertiary butyl sulfonic acid (ATBS), and/or salts thereof, and a subsequent post treatment step on the resulting polymer.

The above-mentioned post treatment step is carried out after the polymerization of monomers.

In a second aspect, the invention provides an injection fluid for oil and gas recovery process, said fluid being prepared with the composition of the invention. The injection fluid may be a polymer flooding injection fluid or a fracturing fluid.

In a third aspect, the present invention provides a method of treating a portion of subterranean formation comprising providing the composition of the invention, preparing an injection fluid with at least said composition, introducing the injection fluid into portion of the subterranean formation.

Treating a portion of a subterranean formation includes treating part of the subterranean formation or treating the entire subterranean formation.

In a fourth aspect, the invention provides a fracturing method comprising providing the composition of the invention, preparing a fracturing fluid with at least said composition and with at least a proppant, introducing the fracturing fluid into portion of the subterranean formation.

In a fifth aspect, the invention provides a polymer flooding method comprising providing composition of the invention, preparing a polymer flooding injection fluid with at least said composition, introducing the polymer flooding injection fluid into portion or the entire subterranean formation.

In a sixth aspect, the invention provides a method of improving the suspensive properties in an injection fluid comprising providing the composition of the invention, preparing the injection fluid by mixing said composition in water, sea water or brine, introducing the injection fluid into portion or the entire subterranean formation. The aqueous treatment fluid may be a fracturing fluid or a polymer flooding injection fluid. In other words, this method consists in improving the suspension of particles or colloids that are present in an injected fluid.

DETAILED DESCRIPTION OF THE INVENTION

It has been discovered that a composition comprising the combination of an inverse emulsion of water-soluble polymer A, preferably obtained under a certain level of vacuum, and solid particles of specific water-soluble polymer B obtained in a two steps process, leads to an improvement of the suspensive effect, even in high brines, and even in high shear conditions.

The suspensive effect refers to the suspension of particles or colloids that are present in an injection fluid and/or an injected fluid. This corresponds to the capacity that the composition of the invention gives to the injection fluid to suspend particles or colloids such as proppant, and to avoid sedimentation. This property is very important in fracturing operation where proppant such as sand or coated sand are present in the injection fluid to maintain open the fractures, and that allow an efficient recovery of oil and gas.

According to the invention, the post treatment step consists in reacting hydrolysable function of a polymer comprising hydrolysable functions with a hydrolysis agent. This hydrolysis agent may be an enzyme, an ion exchange resin, or an alkali metal. Preferably, the hydrolysis agent is a Brønsted base, preferably soda, more preferably caustic soda. Carboxylate group or carboxylic acid moieties are created in the treated polymer. Indeed, the reaction between hydrolysis agent and the hydrolysable function such as amide results in the formation of a carboxylate or carboxylic acid moieties.

As used herein, the term "water-soluble polymer" refers to a polymer which gives an aqueous solution substantially without insoluble particles when 10 g/l are appropriately mixed with water at 25° C.

When the term "polymer A" is used in the present invention, it corresponds to the water-soluble polymer A. This is the same for water-soluble B.

The polymer A and the polymer B may be different or identical, but their form is different, polymer A being in water in oil emulsion form, and polymer B being in particles forms (powder, fines, granules, beads). Polymer A is preferably different from polymer B. More precisely, polymer A and polymer B have preferably not the same monomeric composition and/or not the same molecular weight. Polymer A and polymer B are preferably two distinct polymers.

The Composition of the Invention

The specificity of the invention is to combine an inverse emulsion of a specific water soluble-polymer A, preferably polymerized under a certain level of vacuum, and solid particles of a specific water soluble-polymer B obtained in a two steps process comprising a post treatment step.

According to a first aspect, the invention provides a composition for preparing an injection fluid in oil and gas recovery comprising:

An inverse emulsion of a water-soluble polymer A comprising acrylamide monomer units, and Solid particles of a water-soluble polymer B, wherein water-soluble polymer B is obtained by a polymerization step of at least acrylamide and 1 and 15 mol % of acrylamido tertiary butyl sulfonic acid (ATBS), and/or salts thereof, and a subsequent post treatment step of the resulting polymer.

The above-mentioned post treatment step is carried out after the polymerization of monomers, preferably before the solid particles are produced.

Salts include salts of metals, for instance alkaline metals and alkaline earth metals, salts of ammoniums, and salts of other cationic organic compounds.

The composition is in liquid form even if it contains dispersed solid particles. The composition is therefore easily transportable, dispersible, pumpable, stable to storage, which facilitates its use in oil and gas recovery conditions.

As described above, polymer A and polymer B are preferably different, and they have at least not the same monomeric composition and/or not the same molecular weight. Polymer A and polymer B are preferably two distinct polymers.

The composition is obtained by mixing appropriately the inverse emulsion of polymer A with solid particles of polymer B obtained according to the invention. The mixture is preferably made by dispersing the solid particles in the inverse emulsion. Any appropriate mean can be used to make the mixture such as blender, rotor/stator mixer, batch stirrer, disperser, Polymer Slicing Unit (PSU) such as described in the document U.S. Pat. No. 8,186,871.

Even if not preferred, solid particles of polymer B may also be pre-wetted with an oil similar or different than the one used in the inverse emulsion of polymer A, or in a brine, generally at a concentration from 40% to 80% by weight of solid particles (polymer B) related to the total amount of liquid (pre-wetting liquid) and solid particles (polymer B).

The pre-wetting composition contains oil or brine and may contain surfactant(s) and other ingredients.

According to the invention, the solid particles of polymer B remain in solid state in the composition of the invention. In other terms, polymer B is in solid state and dispersed in the composition while polymer A is in the hydrophilic droplets of the water-in-oil emulsion. The polymer B may absorb part or all of the free water of the inverse emulsion (of polymer A) and be pre-swollen but remains in solid state. Solid state includes these pre-wetted and pre-swollen states.

In practice, in oil and gas recovery process, the composition of the invention is mixed with an aqueous medium such as water, sea water or brine to form the injection fluid. When the composition is appropriately mixed with a sufficient amount of aqueous medium, the inverse emulsion is inverted, and the polymer A is rapidly released, whereas the polymer B starts to dissolve more slowly in the aqueous medium, even if pre-swollen.

In the composition of the invention, the mass ratio between the inverse emulsion of polymer A and the solid particles of polymer B is preferably comprised between 1:1 and 10:1, more preferably between 6:1 and 2:1.

In the composition of the invention, the total concentration of polymer A and polymer B is preferably comprised between 30 w % and 80 w %, more preferably between 37 w % and 70 w %, even more preferably between 40 w % and 65 w %.

The composition according to the invention may also comprise other components such as natural thickener such as clay, or synthetic thickener, salts, alkaline agent, surfactant such as the one used in the inverse emulsion or others, biocides, corrosion inhibitor, acids, scale inhibitors, clay swelling inhibitor, guar, guar derivatives, carboxymethyl cellulose, crosslinkers such as zirconium, titanate or borate compounds, delayed crosslinkers.

In the present invention, a particular attention is paid to the rheological analysis of the injection fluids in which the composition of the invention is used. The measurement of different rheological parameters is conducted according to the method described below.

1) Flow Curve

Using an Anton Paar MCR302 rheometer equipped with RheoCompass software and a Cone-Plan measurement system (50 mm-2°), the viscosity as a function of the shear gradient is measured. The normal force is reset after loading and unloading the sample. The shear gradient range can range from 0.001 to 500 s-1 for a temperature of 25° C.

The curve obtained is then modeled by the Carreau-Yasuda equation, allowing to recover the Newtonian viscosity ($\eta 0$ in cps), the relaxation time ($\tau$ in sec.) And the flow index (n, flow index). The adjustment value "a" being considered equal to 2.

$$\eta = 1 + (\eta_0 - 1) \cdot (1 + (\tau \cdot \dot{\gamma})^a)^{\frac{n-1}{a}}$$

During the measurement of the flow curve, parameter Ni is also recorded. It corresponds to the first difference of the normal stresses and increases as the shear gradient increases in the viscoelastic materials. It is the manifestation of the Weissenberger effect. Ni is equal to 0 for an isotropic fluid at rest and is never negative.

2) Oscillatory Measurement

In order to determine the linearity range of the material, the elastic modulus G' and loss G" are recorded at 1 Hz for deformations ranging from 0.1 to 100%. The response of the device remained linear up to 10% in general.

In order to realize the frequency sweep of the material, G' and G" are measured from 10 to 0.001 Hz for a deformation comprised in the linear domain, generally 1%.

When measurable, the point of intersection between G' and G" is used to determine the viscoelastic relaxation time according to the following formula:

$$T_{osc.} = \frac{1}{2\pi \cdot f_{G'=G''}}$$

3) Calculation

In order to discriminate the products between them, it is possible to evaluate these sand suspension performances statically, by the calculation of the sedimentation velocity, and dynamically, by the calculation of λe/v.

a) Calculation of the Sedimentation Rate

The calculation of the sand sedimentation rate in a viscoelastic fluid is described in the literature (without being exhaustive: SPE 187255, SPE16221) and is based on the following formula:

$$v_p = \left(\frac{2^n g \Delta\rho}{9K}\right)^{\frac{1}{n}} \cdot d^{\frac{n+1}{n}}$$

With g: the acceleration of gravity (9.81 m/s²),
Δρ: the difference in density between sand and fluid (: 1650 kg/m3),
d: the diameter of the sand particle (0.86 mm/l) example),
K: the consistency index and n: flow index.

Here we forget the phenomena of sticking and wall which can strongly impact the sedimentation rate and we use this parameter to make a classification between the products.

b) Calculation of λe/v

The dimensionless number λe/v is used to determine the capacity of the fluid to suspend sand under shear. This number depends on the following rheological parameters:

$$\lambda_{e/v} = \frac{0.5.c.\tau_{osc}.N_1(\dot{\gamma})}{\eta(\dot{\gamma})}$$

With c: constant (: 11).

When the value is greater than 1 the system is dominated by elastic forces ensuring good suspension capabilities.

The composition alpha of the invention offers to an injection fluid A a suspensive effect such as the value at 500 s⁻¹ of λe/v of an injection fluid A prepared by mixing 0.5% in weight of a composition alpha of the invention in a API brine, is at least 50% higher, preferably 75% higher, more preferably 100% higher, even more preferably 125% higher, even more preferably 150% higher than the value of λe/v of a injection fluid B prepared by mixing 0.5% in weight of a composition beta in a 7% NaCl brine, wherein said composition beta is the same as composition alpha except that polymer B does not comprise acrylamide monomer units and between 1 and 15 mol % of ATBS and/or salt(s) thereof, and in which polymer B is not obtained by a polymerization step and a subsequent post treatment step.

Solid Particles of a Water-Soluble Polymer B

According to the invention, the water-soluble polymer B has two specificities. The first one is that it contains a limited and specific amount of acrylamido tertiary butyl sulfonic acid (ATBS) and/or their salt. The second one is that it is obtained in a two steps process which comprises a polymerization step and a subsequent post treatment step.

The first step for obtaining polymer B is the polymerization step that comprises the polymerization of at least acrylamide monomers and at least 1 to 15 mol % of acrylamido tertiary butyl sulfonic acid (ATBS), and/or salts thereof, and optionally at least one non-ionic monomer different from acrylamide, and/or at least one anionic monomer different from ATBS, and/or at least one cationic monomer, and/or at least one zwitterionic monomer. Polymer obtained after the polymerization step is called polymer C.

The skilled man in the art will be able to adjust the respective amounts of monomers of polymers B and C to reach 100 mol %.

The amount of acrylamido tertiary butyl sulfonic acid (ATBS) and/or their salt in polymer B and in polymer C is substantially the same because the post treatment step does not affect significantly the monomer units of ATBS and/or their salts. This amount is preferably comprised between 2 and 12 mol %, more preferably between 3 and 10 mol %, even more preferably between 4 and 8 mol %. The expression mol % means the percentage in mole compare to the total amount of moles of monomers.

In a preferred embodiment, acrylamido tertiary butyl sulfonic acid (ATBS) is the ATBS monohydrate described in the document WO 2018/172676. The use of ATBS monohydrate is particularly useful to reach the best performances in terms of viscosifying effect and suspensive effect. As specified in WO 2018/172676, the ATBS monohydrate is the hydrated crystalline form of ATBS having the following X-Ray powder diffraction peaks: 10.58°, 11.20, 12.65°, 13.660, 16.28°, 18.450, 20°, 20.40, 22.5°, 25.50, 25.88°, 26.470, 28.52°, 30.28°, 30.8°, 34.09°, 38.19°, 40.69°, 41.82°, 43.74°, 46.04° degrees 2-thêta (+/−0.1°).

In polymer C, the amount of acrylamide is preferably comprised between 20 and 99.9 mol %, more preferably between 40 and 95 mol %, even more preferably between 50 and 85 mol %.

The preferred polymerization process to obtain polymer C is the gel polymerization process that consists of polymerizing adiabatically monomers in solution to obtain a gel.

The second step for obtaining polymer B is the post treatment step that comprises the reaction of the polymer C with a hydrolysis agent.

The post treatment step consists in reacting hydrolysable function of polymer C such as amide with a hydrolysis agent. This hydrolysis agent may be an enzyme, an ion exchange resin, or an alkali metal, preferably, it is a Brønsted base.

After the post treatment step, carboxylate group or carboxylic acid moieties are created.

Indeed, the reaction between hydrolysis agent and the hydrolysable function such as amide results in the formation of a carboxylate or carboxylic acid moieties.

Carboxylate bearing polyacrylamides may be obtained according to different processes. Among them, one process is to polymerize acrylamide which has been partially or totally pre-hydrolyzed before the polymerization with caustic soda or an enzyme such as an amidase. Another process is to copolymerize acrylamide and acrylic acid and/or salt thereof. Another process is to add a hydrolyzing agent before, at the start and/or during the polymerization, wherein said addition is either made on the concentrated or diluted solution, on the emulsion, dewatered emulsion, or on the gelatinous substance. Another process is to add a hydrolyzing agent after the polymerization, wherein said addition is either made in concentrated or diluted media. The polymerization can be solution polymerization, emulsion polymerization, dispersion polymerization, or gel polymerization. The post treatment step can be made on the finished polymer or the polymer can be dissolved at a pumpable concentration in a solvent at typically at 1 to 6% of polymer concentration.

All the above techniques have advantages and drawbacks related to waste gas production, molecular weight, heat release, process of production.

It has been found that among the multiple ways to obtain carboxylate bearing polyacrylamides, only one provides solid particles of polymer B containing acrylamide monomer units and between 1 and 15 mol % of ATBS, which combined with inverse emulsion of polymer A leads to a composition that offers optimal performances in terms of suspensive effect.

In a very preferred embodiment, polymer B is obtained according to a process that comprises successively:
  Providing an aqueous solution of monomers comprising at least acrylamide and 1 to 15 mol % of acrylamido tertiary butyl sulfonic acid (ATBS), and/or salts thereof;
  Polymerizing said aqueous solution of monomers to obtain a gel of polymer C;
  Cutting said gel in pieces, preferably of less than 10 cm$^3$, more preferably less than 5 cm$^3$, more preferably less than 1 cm$^3$;
  Realizing a post treatment step by mixing a hydrolyzing agent on said pieces of gel
  Obtaining treated pieces of gel of polymer B at the end of the post treatment step;
  Drying said treated pieces of gel;
  Obtaining a powder of polymer B
  Optionally grinding said powder;
  Optionally sieving said powder.

Thanks to this specific process of obtaining polymer B, the composition of the invention offers optimal performances in terms of viscosifying effect and suspensive effect.

The rate of conversion is the number of hydrolysable functions, such as an amide, in mol % which are converted in carboxylate or carboxylic acid moieties, as compared to the total amount of mole of monomeric units in polymer C (including hydrolysable and non-hydrolysable monomeric units).

In a preferred embodiment, the rate of conversion is at least 5 mol %, preferably at least 10 mol %. The maximum rate of conversion depends of parameters such as the content of monomers having a hydrolysable function, the number of hydrolysable functions on each monomer, the total carboxylate functions content in the polymer. Generally, the maximum rate of conversion is 40 mol %, preferably 30 mol %. The preferred rate of conversion is comprised between 10 and 25 mol %.

According to a preferred embodiment, the hydrolysable function in polymer C is the amide from acrylamide monomer, and the post treatment step converts the amide in carboxylate or carboxylic acid group. More preferably, the amide function of the acrylamide monomer units are converted in carboxylate salt and/or carboxylic acid moieties.

For example if polymer C is obtained by polymerization of 90 mol % of acrylamide and 10 mol % of acrylamido tertiary butyl sulfonic acid (ATBS), and/or salts thereof, and that the post treatment step is made with caustic soda, and that the rate of conversion is 15 mol %, the obtained polymer B composition is 75 mol % of acrylamide, 15 mol % of sodium carboxylate moieties and 10 mol % of acrylamido tertiary butyl sulfonic acid (ATBS), and/or salts thereof.

The post treatment step, preferably conducted as it is described in the preferred process above, combined with the specific amount of ATBS and/or salts thereof are essential to the invention to reach unexpected performances in terms of viscosifying effect and suspensive effect.

The polymer B may be anionic or amphoteric.

The water-soluble polymer B is a polymer of acrylamide and acrylamido tertiary butyl sulfonic acid (ATBS) and/or salt(s) thereof, that also contains monomer units comprising carboxylate or carboxylic acid moieties. This polymer may also comprise additional monomers such as non-ionic monomer different from acrylamide, and/or anionic monomer different from ATBS, and/or cationic monomer, and/or zwitterionic monomer.

As said earlier, the polymer B comprises between 1 and 15 mol %, preferably, 2 and 12 mol %, more preferably between 3 and 10 mol %, even more preferably between 4 and 8 mol % of acrylamido tertiary butyl sulfonic acid (ATBS) and/or their salt.

The polymer B comprises preferably between 15 and 95.9 mol %, preferably between 15 and 90 mol %, more preferably between 35 and 90 mol %, even more preferably between 45 and 75 mol % of acrylamide.

The polymer B comprises preferably between 10 and 40 mol %, more preferably between 15 and 30 mol % of carboxylate or carboxylic acid moieties. Monomer units comprising carboxylate or carboxylic acid group may therefore come from the use of monomers in the polymerization step (for instance an additional monomer such as acrylic acid) and the conversion of hydrolysable functions during the post treatment step.

The rate of conversion relates to functions converted to carboxylate or carboxylic acid moieties during the post treatment step. It does not include carboxylate and carboxylic acid moieties that do not result from the post treatment step. For instance, when polymer C is prepared by polymerization of acrylamide, ATBS and acrylic acid, the rate of conversion does not include the carboxylic acid group of acrylic acid.

In a preferred embodiment, more than 50 mol % of the monomer units comprising carboxylate or carboxylic acid moieties, preferably more than 70 mol %, even more preferably more than 90 mol %, even more preferably all the carboxylate or carboxylic acid moieties are the result of the conversion of hydrolysable functions during the post treatment step.

The polymer B is preferably a polymer comprising 30 to 88 mol %, preferably 50 to 88 mol %, of acrylamide, from 2 to 12 mol %, preferably from 3 to 10 mol %, more preferably from 4 to 8 mol %, of acrylamido tertiary butyl sulfonic acid (ATBS) and/or salt(s) thereof, and from 10 to 40 mol %, preferably from 10 to 30 mol %, more preferably from 10 to 25 mol % of monomer units comprising carboxylate or carboxylic acid moieties, and wherein all the monomeric units comprising carboxylate or carboxylic acid moieties are preferably the result of the conversion of hydrolysable functions during the post treatment step.

In a specific embodiment of the invention, polymer B is preferably a polymer comprising 30 to 88 mol %, preferably 50 to 88 mol %, of acrylamide, from 2 to 12 mol %, preferably from 3 to 10 mol %, more preferably from 4 to 8 mol %, of acrylamido tertiary butyl sulfonic acid (ATBS) and/or salt(s) thereof, and from 10 to 40 mol %, preferably from 10 to 30 mol %, more preferably from 10 to 25 mol % of monomer units comprising carboxylate or carboxylic acid moieties, and wherein all the monomer units comprising carboxylate or carboxylic acid moieties are preferably the result of the conversion of hydrolysable functions during the post treatment step, wherein polymer B only contain acrylamide monomer units, ATBS monomer units, and monomer units comprising carboxylate or carboxylic acid moieties.

In a specific and preferred embodiment, polymer B is an amphoteric polymer that comprises preferably between 0.1 and 5 mol %, more preferably between 0.5 and 3 mol % of cationic monomer. Preferred cationic monomer are dimethylaminoethyl (meth)acrylate chloromethylated, diallyldimethyl ammonium chloride; (meth)acrylamidopropyltrimethylammonium chloride. In this embodiment, polymer B is preferably a polymer comprising 25 to 84 mol %, preferably 45 to 84 mol %, of acrylamide, from 2 to 12 mol %, preferably from 3 to 10 mol %, more preferably from 4 to 8 mol %, of acrylamido tertiary butyl sulfonic acid (ATBS) and/or salt(s) thereof, from 0.1 to 5 mol %, preferably from 0.5 to 3 mol % of cationic monomer, and from 10 to 40 mol %, preferably from 10 to 30 mol %, more preferably from 10 to 25 mol % of monomer units comprising carboxylate or carboxylic acid moieties, and wherein all the monomer units comprising carboxylate or carboxylic acid moieties are preferably the result of the conversion of hydrolysable functions during the post treatment step.

Additional non-ionic monomers are preferably selected from the group comprising methacrylamide; N-mono derivatives of acrylamide; N-mono derivatives of methacrylamide; N,N derivatives of acrylamide; N,N derivatives of methacrylamide; acrylic esters; and methacrylic esters. The most preferred additional non-ionic monomers are N-vinylpyrrolidone and N-vinylformamide. Derivatives preferably refers to derivatives having C1 to C6 alkyl, cycloalkyl or aryl groups or hydrocarbonated chains having heteroatom(s). These non-ionic monomers do not include the hydrophobic monomers mentioned thereafter.

Additional anionic monomers are preferably selected from the group comprising monomers having a carboxylic function and salts thereof; monomers having a sulfonic acid function and salts thereof; monomers having a phosphonic acid function and salts thereof such as vinylphosphonic acid. They include for instance acrylic acid, methacrylic acid, maleic acid, itaconic acid; salts thereof and hemi esters thereof. The most preferred additional anionic monomers are acrylic acid, and salts thereof. Generally, salts are alkaline salts, alkaline earth salts or ammonium salts. Preferred salts are sodium salts.

Cationic monomers are preferably selected from the group comprising dimethylaminoethyl acrylate (DMAEA) quaternized or salified; dimethylaminoethyl methacrylate (DMAEMA) quaternized or salified; diallyldimethyl ammonium chloride (DADMAC); acrylamidopropyltrimethyl ammonium chloride (APTAC); methacrylamidopropyltrimethylammonium chloride (MAPTAC). Dimethylaminoethyl acrylate (DMAEA) quaternized or salified is preferred.

Zwitterionic monomer may be a derivative of an acrylamide, acrylic, vinyl, allylic or maleic unit, this monomer having an amine or quaternary ammonium function and a carboxylic acid (or carboxylate), sulphonic acid (or sulphonate) or phosphoric acid (or phosphate or phosphonate). The dimethylaminoethyl acrylate derivatives, such as 2-((2-(acryloyloxy) ethyl) dimethylammonio) ethane-1-sulfonate, may be mentioned in particular and in a nonlimiting manner, the 3-((2-(acryloyloxy) ethyl) dimethylammonio) propane-1-sulfonate, 4-((2-(acryloyloxy) ethyl) dimethylammonio) butane-1-sulfonate, [2-(acryloyloxy) ethyl](dimethylammonio) acetate, methacrylate derivatives of dimethylaminoethyl such as 2-((2-(methacryloyloxy) ethyl) dimethylammonio) ethane-1-sulfonate, 3-((2-(methacryloyloxy) ethyl) dimethylammonio) propane-1-sulfonate, 4-((2-(methacryloyloxy) ethyl) dimethylammonio) butane-1-sulfonate, [2-(methacryloyloxy) ethyl] (dimethylammonio) acetate, dimethylamino propylacrylamide derivatives such as 2-((3-acrylamidopropyl) dimethylammonio) ethane-1-sulfonate, 3-((3-acrylamidopropyl) dimethylammonio) propane-1-sulfonate, 4-((3-acrylamidopropyl) dimethylammonio) butane-1-sulfonate, [3-(acryloyl) oxy) propyl] (dimethylammonio) acetate, dimethylamino propyl methylacrylamide derivatives such as 2-((3-methacrylamidopropyl) dimethylammonio) ethane-1-sulfonate, 3-((3-methacrylamidopropyl) dimethylammonio) propane-1-sulfonate 4-((3-methacrylamidopropyl) dimethylammonio) butane-1-sulfonate and [3-(methacryloyloxy) propyl] (dimethylammonio) acetate.

Monomers having a hydrophobic character may also be used as a co-monomer for the preparation of the water-soluble polymer C but at a concentration in weight based on the total monomer content of preferably less than 2%. They are preferably selected from the group comprising (meth)acrylic acid esters having an alkyl, arylalkyl and/or ethoxylated and/or propoxylated chain; derivatives of (meth)acrylamide having an alkyl, arylalkyl or dialkyl chain and/or ethoxylated and/or propoxylated chain; cationic allyl derivatives having an alkyl, arylalkyl or dialkyl chain and/or ethoxylated and/or propoxylated chain; anionic or cationic hydrophobic (meth)acryloyl derivatives; and anionic or cationic monomers derivatives of (meth)acrylamide bearing a hydrophobic chain. The alkyl groups of these hydrophobic monomers are preferably C6 to C24 alkyl groups. Most preferred monomers are methacrylamido dimethyl amino propyl derivates bromoalkylated with a C8-C16 alkyl chain and the Ethoxylated Behenyl Methacrylate It is also possible to use a branching agent. Such an agent is, for example, chosen from methylenebisacrylamide (MBA), ethylene glycol diacrylate, tetraallyl ammonium chloride polyethylene glycol dimethacrylate, diacrylamide, cyanomethyl acrylate, vinyloxyethyl acrylate, vinyloxy methacrylate, triallylamine, formaldehyde, glyoxal, glycidyl ethers such as ethylene glycol diglycidyl ether, and epoxies, and mixtures thereof. But when using such branching agent, the quantity used is such that the water-soluble polymer C and B is still water-soluble.

It is also possible to use a free radical chain transfer agent, otherwise known as a chain limiter. The use of a transfer chain agent is particularly advantageous for controlling the molecular weight of the polymer obtained. By way of example of a transfer agent, reference may be made to methanol, isopropanol, sodium hypophosphite, 2-mercaptoethanol and sodium methallyl sulfonate, and mixtures thereof. Those skilled in the art will adjust, in a known manner, the amounts of branching agent, and optionally of transfer agent.

According to the invention, the water-soluble polymer B may have a linear structure, branched, star, comb, block, microblock structure or a controlled polydispersity in molecular weight. These properties can be obtained by selection at the choice of the initiator, of the transfer agent, of the polymerization technique such as the template polymerization, controlled radical polymerization known as RAFT (reversible chain transfer by addition-fragmentation), NMP (Nitroxide Mediated Polymerization) or ATRP (Atom Transfer Radical Polymerization), the incorporation of structural monomers, the concentration. The general knowledge of the skilled person allows him to prepare a water-soluble polymer having one of these types of structure. The polymer B of the invention, when with a specific morphology, remain water soluble.

The polymerization is generally a radical polymerization. By radical polymerization, we include radical polymerization by means of UV, azo, redox or thermal initiators as well as controlled radical polymerization (CRP) techniques or RAFT polymerization techniques.

According to the invention, the solid particles of the water-soluble polymer B may be in the form of powder, fines, granules or beads. They may be spherical or not.

In a preferred embodiment, the particles of polymer B are of fine particle size and called fines. Fines are preferably obtained by sieving and/or grinding the powder obtained by gel polymerization process above described after drying. Before mixing with the inverse emulsion of polymer A, the fines of polymer B have preferably a particle size distribution, represented by the D50 value comprised between 5 µm and 500 µm, more preferably between 50 µm and 400 µm, even more preferably between 100 µm and 350 µm. The selection of fines is particularly useful to reach optimal performances in terms of viscosifying effect and suspensive effect in the injection fluid.

There are a number of methods used to monitor particle size distribution. The most popular include sieve analysis, direct imaging and laser diffraction. Historically, particle size distributions were calculated based on results from sieve analysis. Sieve analysis presents particle size information in the form of an S-curve of cumulative mass retained on each sieve versus the sieve mesh size. The most commonly used metrics when describing particle size distributions are D-Values (D10, D50 & D90) which are the intercepts for 10%, 50% and 90% of the cumulative mass.

D-values can be thought of as the diameter of the sphere which divides the sample's mass into a specified percentage when the particles are arranged on an ascending mass basis. For example, the D10 is the diameter at which 10% of the sample's mass is comprised of particles with a diameter less than this value. The D50 is the diameter of the particle that 50% of a sample's mass is smaller than and 50% of a sample's mass is larger than.

The particles of polymer B may absorb part or all of the free water of the inverse emulsion and be pre-swollen but remain solid. The size of the particles in the composition tends to grow due to the water absorption. The size of particles of polymer B in the composition is preferably comprised between 10 µm and 1500 µm, more preferably between 80 µm and 1000 µm, even more preferably between 150 µm and 800 µm.

The water-soluble polymer B according to the invention has preferably an average molecular weight by weight comprised between 1 million g/mol and 50 million g/mol, more preferably higher than 10 million g/mol, more preferably higher that 15 million g/mol, even more preferably higher than 20 million g/mol.

The "weight average molecular weight" according to the present invention is determined by the intrinsic viscosity. The intrinsic viscosity can be measured by methods known to the skilled person and especially can be calculated from the values of reduced viscosity for different concentrations by a graphical method consisting of plotting the reduced viscosity values (on the ordinate axis) against the concentrations (on the abscissa axis) and extrapolating the curve to zero concentration. The intrinsic viscosity value is read off the ordinate axis or by using least square method. Then the weight average molecular weight can be determined by the well-known Mark-Houwink equation:

$$[\eta]=KM^{\alpha}$$

$[\eta]$ represents intrinsic viscosity of the polymer determined by solution viscosity measuring method, K represents an empiric constant, M represents molecular weight of the polymer, $\alpha$ represents the Mark-Houwink coefficient $\alpha$ and K, depend on the particular polymer-solvent system Inverse Emulsion of Water-Soluble Polymer A According to the invention, the composition comprises an inverse emulsion of a water-soluble polymer A comprising acrylamide monomer units, and solid particles of a water-soluble polymer B as described above.

An inverse emulsion, otherwise known as a water-in-oil emulsion, is composed of an oily phase, generally a lipophilic solvent or an oil, which constitutes the continuous phase, in which water droplets comprising a polymer are in suspension, these water droplets forming a dispersed phase. An emulsifying surfactant (called a water-in-oil surfactant) which is placed at the water/oil interface stabilizes the dispersed phase (water+polymer) in the continuous phase (lipophilic solvent or oil).

The inverse emulsion of water-soluble polymer A can be prepared according to any process known by the person skilled in the art. Generally, an aqueous solution comprising the monomer(s) is emulsified in an oil phase comprising the emulsifying agent(s). Then, the polymerization is made by adding a free radical initiator. Reference may be made to redox couples, with cumene hydroperoxide, tertiary butylhydroxyperoxide or persulfates among the oxidizing agents, sodium sulfite, sodium metabisulfite and the Mohr salt among the reducing agents. Azo compounds such as 2,2'-azobis(isobutyronitrile) and 2,2'-azobis(2-amidinopropane) hydrochloride can also be used.

The polymerization is generally a radical polymerization. By radical polymerization, we include radical polymerization by means of UV, azo, redox or thermal initiators as well as controlled radical polymerization (CRP) techniques or RAFT polymerization techniques.

The inverse emulsion of water-soluble A is preferably prepared according to the process comprising the following steps:
a) Preparing an aqueous phase comprising acrylamide, and optionally other water-soluble monomers,
b) Preparing an oily phase comprising at least one oil and at least one water-in-oil surfactant,
c) Mixing the aqueous phase and the oily phase to form a water in oil emulsion,
d) Once the water in oil emulsion is formed, polymerizing under substantially oxygen free conditions the monomers of the aqueous phase with at least one free radical polymerization initiator system.
e) At the end of the polymerization, obtaining an inverse emulsion of polymer,
f) Optionally, and preferably distillate said inverse emulsion;
g) Optionally, performing a post treatment on the polymer of said inverse emulsion.

The skilled man in the art will be able to adjust the respective amounts of monomers of polymer A to reach 100 mol %.

Optional step f) may be realized before or after step g). Preferably step f) is realized after step g). Mixing step c) is preferably conducted under high shear.

First Specific and Preferred Embodiment of the Inverse Emulsion of Water-Soluble Polymer A According to a first specific and preferred embodiment, the inverse emulsion of water-soluble A is obtained by polymerization carried out partially or totally at a pressure preferably comprised between 0.1 and 200 mbar, more preferably between 5 and 150 mbar, even more preferably between 20 and 100 mbar.

Even if the composition of the invention already offers superior viscosifying and suspensive effect compare to the composition of the prior art, the polymerization at a certain level of vacuum of the inverse emulsion further improves the performances in terms of viscosifying effect and suspensive effect.

According to the specific and preferred embodiment, when the polymerization of the inverse emulsion of water-soluble polymer A is carried out partially at a pressure of less than 200 mbar, the duration on which the polymerization is carried out at a pressure of less than 200 mbar represents preferably at least 10% of the total polymerization duration, preferably at least 30%, more preferably more than 50%, even more preferably more than 80%. In a preferred embodiment, the polymerization is totally conducted at a pressure of less than 200 mbar.

The polymerization is preferably conducted batch wise. In an industrial perspective it is preferable to produce large batch, but it is generally difficult to increase the batch volume. It has been found that the volume of batch polymerization can be more than 10 $m^3$, preferably higher than 20 $m^3$, and more preferably higher than 40 $m^3$, when the polymerization is carried out at a pressure of less than 200 mbar When the polymerization is carried out partially or totally at a pressure from 0.1 to 200 mbar, in practice, steps a), b), and c) are made at atmospheric pressure, and the pressure is lowered to a value at least below 200 mbar throughout all or part of the duration of the polymerization, preferably during all the polymerization step. Additional steps of degassing with nitrogen and of increasing to the reaction temperature may be added to the steps described previously.

At the end of the polymerization, the reactor is returned to atmospheric pressure to discharge the water in oil emulsion. It is also possible to maintain a pressure below 200 mbar during step a, and/or b) and/or c), and/or during the discharge and/or during the storage of the inverse emulsion.

The means for lowering the pressure are all the known means, without this being limiting. Examples that may be mentioned include positive displacement pumpssuch as liquid ring pumps or diaphragm pumps, momentum transfer pumps, regenerative pumps, entrapment pumps, steam ejectors The polymerization is preferably performed in a reactor capable of maintaining the low pressure necessary for the process. A condenser may also be advantageously used to remove water and/or a mix of volatiles or oil from the exhaust gas pulled from the emulsion during polymerization under vacuum.

The polymerization is generally initiated after depressurizing the reactor but may also be initiated before or during the pressure reduction step. The depressurization step generally lasts a few seconds, or even a few minutes, depending on the volume of the reactor, and depending on the equipment used to achieve the vacuum.

According to one particular embodiment, the following are thus successively performed:
 steps a), b) and c) are made at atmospheric pressure, and include nitrogen sparging,
 the pressure is lowered,
 the polymerization of step d) is initiated.

In another embodiment, the following are successively performed:
 steps a), b) and c) are made at atmospheric pressure, and include nitrogen sparging,
 simultaneously, the pressure is lowered, and the polymerization is initiated.

In another embodiment, the following are successively performed:
 steps a), b) and c) are made at atmospheric pressure, and include nitrogen sparging,
 the polymerization is initiated,
 the pressure is lowered during the polymerization.

In a preferred embodiment, the exhaust gas formed during polymerization under vacuum consisting of a mix of water and oil is not returned to the polymerization mass but condensed using a condenser and removed from polymer A.

Second Specific and Preferred Embodiment of the Inverse Emulsion of Water-Soluble Polymer A The water-soluble polymer A preferably comprises at least acrylamide monomer units and at least acrylamido tertiary butyl sulfonic acid (ATBS), and/or salts thereof, preferably in an amount of 1 to 15 mol %. The polymer A may optionally further comprise at least one non-ionic monomer different from acrylamide, and/or at least one anionic monomer different from ATBS, and/or at least one cationic monomer, and/or at least one zwitterionic monomer.

The amount of acrylamido tertiary butyl sulfonic acid (ATBS) and/or their salt in polymer A is preferably comprised between 2 and 12 mol %, more preferably between 3 and 10 mol %, even more preferably between 4 and 8 mol %. The expression mol % means the percentage in mole compare to the total amount of mole of monomers.

In a preferred embodiment, acrylamido tertiary butyl sulfonic acid (ATBS) is the ATBS monohydrate described in the document WO 2018/172676. The use of ATBS monohydrate is particularly useful to reach the best performances in terms of viscosifying effect and suspensive effect.

The water-soluble polymer A preferably comprised acrylamide units in a quantity comprised between 20 and 99.9 mol %, more preferably between 40 and 85 mol %, even more preferably between 50 and 75 mol %.

Third Specific and Preferred Embodiment of the Inverse Emulsion of Water-Soluble Polymer A In a preferred embodiment, a post treatment step as described above is performed on the inverse emulsion of polymer obtained at the end of the polymerization step (for example step e), that improves the performances in terms of viscosifying effect and suspensive effect.

When a post treatment step is carried out on the inverse emulsion obtained at the end of the polymerization step, the resulting intermediate polymer is called polymer D. The post treatment on polymer D results in polymer A. The post treatment is conducted such as described above for polymer C, and same preferences applied.

The skilled man in the art will be able to adjust the respective amounts of monomers of polymer D to reach 100 mol %.

Fourth Specific and Preferred Embodiment of the Inverse Emulsion of Water-Soluble Polymer A In a preferred embodiment, the inverse emulsion of polymer A is distilled. After the polymerization in inverse emulsion of polymer A, a subsequent step is realized which consists in distilling the obtained inverse emulsion to convert the inverse emulsion in a dewatered inverse emulsion (DW inverse emulsion).

In order to convert the inverse emulsion obtained to the DW inverse emulsion, after the polymerization, some or all of the water is distilled off from the emulsion thus yielding particles of polymer A dispersed in the oil phase.

Beyond the known advantages of said DW inverse emulsion (economically viable delivery form, low water content, it has been found that said DW inverse emulsion of polymer A, when combined to particles of polymer B according to the invention leads to a composition that offers optimal performances in terms of suspensive effect.

For the DW inverse emulsion, the water is removed to a level of less than about 15%, or less than about 12%, or less than about 10%, or less than about 8%, or less than about 5% by weight. In embodiments, the removal of water along with some oil is carried out by any suitable means, for example, at reduced pressure, e.g. at a pressure of about 0.001 to about 0.5 bars, or about 0.05 to about 0.25 bars. The temperature for water removal steps may typically be from about 50° C. to about 150° C., although techniques which remove water at higher temperatures may be used. In certain embodiments, one or more of the hydrophobic liquids used in the inverse emulsion may be a low boiling liquid, which can distill off together with the water as a mixture. Batch distillation and continuous distillation may be used to produce the DW inverse emulsion, continuous distillation on thin film or wiped film evaporators being preferred.

Before or after removal of the amount of water desired, the one or more inverting surfactants, and other optional components such as polymeric stabilizers, may be added.

In this preferred embodiment the distillation step is realized such as the concentration of polymer A in the DW inverse emulsion is preferably comprised between 44 and 60% by weight, more preferably between 51 and 58% by weight.

General Description of the Inverse Emulsion of Water-Soluble Polymer A

The water-soluble polymer A is preferably a polymer of acrylamide and optionally and preferably acrylamido tertiary butyl sulfonic acid (ATBS) and/or salt(s) thereof, and optionally and preferably acrylic acid and/or salt(s) thereof that may also comprise additional monomers such as non-ionic monomer different from acrylamide, and/or anionic monomer different from ATBS, and/or cationic monomer, and/or zwitterionic monomer.

The water-soluble polymer A is more preferably a terpolymer of acrylamide and acrylamido tertiary butyl sulfonic acid (ATBS) and/or salt(s) thereof, and acrylic acid and/or salt(s) thereof. The polymer A is preferably a terpolymer comprising 30 to 88 mol %, preferably 50 to 88 mol %, of acrylamide, from 2 to 12 mol %, preferably from 3 to 10 mol %, more preferably from 4 to 8 mol %, of acrylamido tertiary butyl sulfonic acid (ATBS) and/or salt(s) thereof, and from 10 to 40 mol %, preferably from 10 to 30 mol %, more preferably from 10 to 25 mol % of acrylic acid and/or salt(s) thereof.

The polymer A comprises preferably between 10 and 40 mol %, more preferably between 15 and 30 mol % of carboxylate or carboxylic acid moieties. Carboxylate or carboxylic acid moieties may come from the use of monomers in the polymerization step and/or the conversion of hydrolysable functions during the post treatment step.

The water-soluble polymer A is preferably anionic or amphoteric.

In a preferred embodiment, polymer A is an amphoteric polymer that comprises preferably between 0.1 and 5 mol %, more preferably between 0.5 and 3 mol % of cationic monomer. The polymer A is preferably a polymer comprising 30 to 84 mol %, preferably 50 to 84 mol %, of acrylamide, from 2 to 12 mol %, preferably from 3 to 10 mol %, more preferably from 4 to 8 mol %, of acrylamido tertiary butyl sulfonic acid (ATBS) and/or salt(s) thereof, and from 10 to 40 mol %, preferably from 5 to 30 mol %, more preferably from 10 to 25 mol % of acrylic acid and/or salt(s) thereof, and from 0.1 mol % to 5 mol %, preferably from 0.5 mol % to 3 mol % of cationic monomer.

Generally, at least one inverting agent is added at the end of the polymerization reaction, preferably at a temperature below 50° C.

At the end of polymerization, and before any distillation, the inverse emulsion of water-soluble A comprises preferably from 10% to 60% by weight of water-soluble polymer A, preferably from 25 to 60%, more preferably from 28 to 45% by weight, even more preferably 28 to 40% by weight, even more preferably from 32 to 40% by weight, even more preferably from 34 to 40% by weight.

Conventionally, the polymerization is generally carried out isothermally, adiabatically or at controlled temperature. That is to say the temperature is kept constant, generally between 10 and 60° C. (isotherm), or else the temperature is left to increase naturally (adiabatic) and in this case the reaction is generally begun at a temperature below 10° C. and the final temperature is generally above 50° C., or, finally, the temperature increase is controlled so as to have a temperature curve between the isotherm curve and the adiabatic curve.

The initial temperature of polymerization is preferably comprised between 0.1 and 40° C., more preferably between 10 and 30° C. The final polymerization temperature is preferably comprised between 20° C. and 90° C., more preferably between 35° C. and 70° C.

The duration of polymerization is preferably less than 24 hours, more preferably less than 10 hours, even more preferably less than 8 hours.

The same additional monomers, branching agent, free radical chain transfer agent as described above may be used to obtained polymer A.

According to the invention, the water-soluble polymer A may have a linear structure, branched, star, comb, block, microblock structure or a controlled polydispersity in molecular weight. These properties can be obtained by selection at the choice of the initiator, of the transfer agent, of the polymerization technique such as the template polymerization, the controlled radical polymerization known as RAFT (reversible chain transfer by addition-fragmentation), NMP (Nitroxide Mediated Polymerization) or ATRP (Atom Transfer Radical Polymerization), the incorporation of structural monomers, the concentration . . . . The general knowledge of the skilled person allows him to prepare a water-soluble polymer having one of these types of structure. The polymer A of the invention, when with a specific morphology, remain water soluble.

The water-soluble polymer A according to the invention has preferably an average molecular weight by weight comprised between 1 million g/mol and 50 million g/mol, more preferably higher than 10 million g/mol, more preferably higher that 15 million g/mol, even more preferably higher than 20 million g/mol.

The oil used to prepare the inverse emulsion of the invention may be a mineral oil, a vegetal oil, a synthetic oil or a mixture of several of these oils. Examples of mineral oil are mineral oil containing saturated hydrocarbons of aliphatic, naphtenic, paraffinic, isoparaffinic, cycloparaffinic or naphthyl type. Example of synthetic oil are hydrogenated polydecene or hydrogenated polyisobutene; an ester such as octyl stearate or butyl oleate. Exxsol® products range from Exxon are suitable oil.

In general, the weight ratio of the aqueous phase to the oil phase during the polymerization is preferably from 50/50 to 90/10, more preferably 70/30 to 80/20.

The inverse emulsion of polymer A preferably comprises from 10 to 50% by weight of oil, more preferably from 15 to 45% by weight.

The inverse emulsion of polymer A preferably comprises from 5 to 55% by weight of water, more preferably from 5 to 35% by weight.

The inverting agent is a surfactant generally having a HLB value greater than 10. By way of example of such inverting agent, reference may be made to ethoxylated sorbitan esters such as sorbitan oleate ethoxylated with 20 equivalents of ethylene oxide (EO 20), sorbitan laurate polyethoxylated with 20 mol of ethylene oxide, castor oil polyethoxylated with 40 mol of ethylene oxide, decaethoxylated oleodecyl alcohol, heptaethoxylated lauryl alcohol, or sorbitan monostearate polyethoxylated with 20 mol of ethylene oxide. Inverting agent may also be polyoxyethylene alkyl phenol; polyoxyethylene (10 mole) cetyl ether; polyoxyethylene alkyl-aryl ether; quaternary ammonium derivatives; potassium oleate; N-cetyl-N-ethyl morpholinium ethosulfate; sodium lauryl sulfate; condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amines with five, or more, ethylene oxide units; ethyleneoxide tristerylphenol; ethylene oxide condensation products of polyhydric alcohol partial higher fatty esters, and their inner anhydrides (e.g., mannitol anhydride, and sorbitol-anhydride); amine oxide; an alkyl polyglucoside; a glucamide; an ester phosphate or an alkylbenzene sulfonic acid salt; hydrosoluble polymeric surfactant.

In a preferred embodiment, the inverting agent is a ethoxylated nonylphenol, preferably having 4 to 10 ethoxylation, an ethoxy/propoxy alcohol, preferably having C12 to C25 ethoxy/propoxylation, or a tridecylic alcohol ethoxylated, or an ethoxy/propoxy fatty alcohol.

The inverse emulsion of polymer A may contain at least two inverting agents, preferably at least three inverting agents, even more preferably at least four inverting agents.

The emulsifying agent is a surfactant generally having a HLB value inferior to 10. By way of example of such emulsifying agent, reference may be made to surfactant polymers such as polyesters having a molecular weight of between 1000 and 3000, products of condensation between a poly(isobutenyl)succinic acid or the anhydride thereof and a polyethylene glycol, block copolymers having a molecular weight of between 2500 and 3500, for example those sold under the Hypermer® names, sorbitan extracts, for instance sorbitan monooleate, sorbitan isostearate or sorbitan sesquioleate, polyethoxylated sorbitan esters, or else diethoxylated oleocetyl alcohol or tetraethoxylated lauryl acrylate, condensation products of higher fatty alcohols with ethylene oxide, such as the reaction product of oleyl alcohol with 2 ethylene oxide units; condensation products of alkylphenols and ethylene oxide, such as the reaction product of nonyl phenol with 4 ethylene oxide units. Products like Witcamide® 511, betaine products and ethoxylated amine are also good candidates as emulsifying agents.

In a preferred embodiment, the emulsifying agent is a sorbitan monoleate, polyethoxylated sorbitan esters or tall oil fatty acid diethanolamide.

The inverse emulsion of polymer A may contain at least two emulsifying agents, preferably at least three emulsifying agents even more preferably at least four emulsifying agents.

At the end of the polymerization reaction, it is also possible for the inverse emulsion obtained to be diluted or concentrated. A dilution is generally made by adding water or salted water in the water in oil emulsion. It is possible to concentrate the obtained emulsion, for instance by distillation.

The inverse emulsion of polymer A preferably comprises from 0.8 to 6% by weight, more preferably from 0.8 to 3% w of at least one emulsifying agent.

The inverse emulsion of polymer A preferably comprises from 1 to 12% by weight, more preferably from 2 to 8% w of at least one inverting agent.

The inverse emulsion of polymer A may comprise from 1 to 17% by weight of salts.

Salts present in the inverse emulsion may be for example sodium salts, lithium salts, potassium salts, magnesium salts, aluminum salts, ammonium salts, phosphate salts, sulfate salts, chloride salts, fluoride salts, citrate salts, acetate salts, tartrate salts, hydrogen phosphate salts, water soluble inorganic salts, other inorganic salts and mixtures thereof. These salts include sodium chloride, sodium sulfate, sodium bromide, calcium chloride, ammonium sulfate, ammonium chloride, lithium chloride, lithium bromide, potassium chloride, potassium bromide, magnesium sulfate, aluminum sulfate, ammonium hydrogen phosphate, sodium hydrogen phosphate, potassium hydrogen phosphate and mixtures thereof. Sodium chloride, calcium chloride ammonium chloride, ammonium sulfate are preferred, and mixtures thereof are further preferred.

In a very preferred embodiment of the invention, the water in oil emulsion of water-soluble polymer A comprises:
from 28 to 58% by weight of water-soluble polymer A;
from 0.8 to 3% by weight of at least one emulsifying agent, preferably of at least two emulsifying agents;
from 2 to 8% by weight of at least one inverting agent, preferably of at least two inverting agents;
from 10 to 50% by weight, preferably from 15 to 45% by weight of oil;
from 5 to 55% by weight, preferably from 5 to 35% by weight of water;
from 0 to 17% by weight of salts, preferably any one or more of sodium chloride, ammonium chloride and ammonium sulfate;
the total amount being 100% by weight;
wherein the water-soluble polymer A is a polymer comprising 30 to 88 mol %, preferably from 50 to 88 mol %, of acrylamide, from 2 to 12 mol % of acrylamido tertiary butyl sulfonic acid (ATBS) and/or salt(s) thereof, and from 10 to 40 mol % of carboxylate or carboxylic moieties, preferably acrylic acid and/or salt(s) thereof, wherein the total amount of monomer is 100 mol %, and wherein the inverse emulsion of water-soluble A is obtained by polymerization carried out partially or totally at a pressure preferably comprised between 0.1 and 200 mbar.

Injection Fluid and Method of Treating a Portion of Subterranean Formation

The composition of the invention offers an improved suspensive effect which is less sensible to shear conditions. The composition of the invention also improves the efficiency at same dosage or keep the same efficiency at lower dosage. This is particularly interesting in fracturing operation, especially when High Viscosity Friction Reducers (HVFR) are used because the dosage of HVFR is generally important.

The composition has also the advantage to be in liquid form and so easily transportable, dispersible, pumpable, storable, which facilitates its use in oil and gas recovery conditions.

The composition alpha of the invention offers to an injection fluid A a suspensive effect such as the value of λe/v at 500 s$^{-1}$ of a fluid A prepared by mixing 0.5% in weight of a composition alpha of the invention in a API brine, is at least 50% higher, preferably 75% higher, more preferably 100% higher, even more preferably 125% higher, even more preferably 150% higher than the value of λe/v of a injection fluid B prepared by mixing 0.5% in weight of a composition beta in a API brine, wherein said composition beta is the same as composition alpha except that polymer B does not comprise acrylamide monomer units and between 1 and 15 mol % of ATBS and/or salt(s) thereof, and in which polymer B is not obtained by a polymerization step and a subsequent post treatment step.

The composition alpha of the invention offers to an injection fluid A a suspensive effect such as the value of λe/v of a fluid A prepared by mixing 0.5% in weight of a composition alpha of the invention in a API brine, is at least 50% higher, preferably 75% higher, more preferably 100% higher, even more preferably 125% higher, even more preferably 150% higher than the value of λe/v of a injection fluid B prepared by mixing 0.5% in weight of a composition beta in a API brine, wherein said composition beta is the same as composition alpha except that polymer B does not comprise acrylamide monomer units and between 1 and 15 mol % of ATBS and/or salt(s) thereof, and in which polymer B is not obtained by a polymerization step and a subsequent post treatment step, and in which the water-in-oil emulsion of polymer A has not been obtained by polymerization carried out partially or totally at a pressure of less than 200 mbar.

$

In a second aspect, the invention provides an injection fluid for oil and gas recovery process, said fluid being prepared with the composition of the invention. The injection fluid may be a polymer flooding injection fluid or a fracturing fluid.

In the method of the invention, the injection fluid is generally made by mixing the composition of the invention with an aqueous medium such as water, sea water or brine.

When the composition is mixed with a sufficient amount of aqueous medium, the inverse emulsion is inverted, and the polymer A is rapidly released, whereas the polymer B starts to dissolve slower in the aqueous medium, even if pre-swollen.

The injection fluid comprises the water-soluble polymer A and B in a total amount of preferably from 0.0005% by weight to 3% by weight, more preferably from 0.02% w to 2% w, even more preferably from 0.05% w to 1% w, even more preferably from 0.5% w to 1% w. The amount of water-soluble polymer A and B varies depending of the oil and gas recovery process, the conditions in the subterranean formation (for example salinity and/or temperature), and the expected results.

The injection fluid may also comprise other components such as proppants (such as sand, coated sand, ceramic beads), alkaline agents, surfactants, complex nanofluid, microemulsions biocides, corrosion inhibitors, acids, scale inhibitors, clay swelling inhibitors, guar, guar derivatives, carboxy methyl cellulose derivatives, crosslinkers such as zirconium, titanate or borate compounds, delayed crosslinker, breakers, encapsulated breakers, preformed particle gels, nanogels, colloidal dispersion gels, clays, bentonites depending of the nature of the recovery process of oil and gas.

Thanks to the improved suspensive effect given by the composition of the invention to the injection fluid that contains particles such as proppants, encapsulated breakers, preformed particle gels, nanogels or microgels, said particles tends to be more stable in the injection fluid, and the sedimentation is greatly decreased.

In a third aspect, the present invention provides a method of treating a portion of subterranean formation comprising providing the composition of the invention, preparing an injection fluid with at least said composition, introducing the injection fluid into portion of the subterranean formation.

Treating a portion of a subterranean formation includes treating part of the subterranean formation or treating the entire subterranean formation.

In a fourth aspect, the invention provides a fracturing method comprising providing the composition of the invention, preparing a fracturing fluid with at least said composition and with at least a proppant, introducing the fracturing fluid into portion of the subterranean formation.

In a fifth aspect, the invention provides a polymer flooding method comprising providing composition of the invention, preparing a polymer flooding injection fluid with at least said composition, introducing the polymer flooding injection fluid into portion or the entire subterranean formation.

In a sixth aspect, the invention provides a method of improving the suspensive effect in an injection fluid comprising providing the composition of the invention, preparing the injection fluid by mixing said composition in water, sea water or brine, introducing the injection fluid into portion or the entire subterranean formation. The aqueous treatment fluid may be a fracturing fluid or a polymer flooding injection fluid.

More precisely, the invention provides a method of improving the suspensive effect in an injection fluid comprising providing the composition of the invention, preparing the injection fluid by mixing said composition in water, sea water or brine, wherein the resultant injection fluid has an improvement in suspensive effect, when compared to the same injection fluid in which the composition of the invention is replaced by a composition which is identical except that polymer B does not comprise acrylamide monomer units and between 1 and 15 mol % of ATBS and/or salt(s) thereof, and in which polymer B is not obtained by a polymerization step and a subsequent post treatment step.

More precisely, the invention provides a method of improving the suspensive effect in an injection fluid comprising providing the composition of the invention, preparing the injection fluid by mixing said composition in water, sea water or brine, wherein the resultant injection fluid has an improvement in suspensive effect, when compared to the same injection fluid in which the composition of the invention is replaced by a composition which is identical except that polymer B does not comprise acrylamide monomer units and between 1 and 15 mol % of ATBS and/or salt(s) thereof, and in which polymer B is not obtained by a polymerization step and a subsequent post treatment step, and in which the water-in-oil emulsion of polymer A has not been obtained by polymerization carried out partially or totally at a pressure of less than 200 mbar.

The composition of the invention may also be used in any subterranean treatment such as drilling operations, stimulation treatments, completion operations and enhanced oil recovery process.

In a preferred embodiment, the present invention provides a fracturing method comprising:
a. Providing the composition of the invention;
b. Adding said composition into an aqueous fluid to form an injection fluid;
c. Adding at least a proppant into the injection fluid either before or after step b;
d. Introducing the injection fluid into portion of the subterranean formation;
e. Fracturing portion of the subterranean formation with the injection fluid;
f. Recovering a mixture of gas, oil and aqueous fluid.

The composition of the invention may also be used advantageously in the paper making industry, in the water or sludge treatment industry, in the construction industry, in the mining industry, in the cosmetics, textile or detergency industry, in the agriculture.

The present invention will further be described by reference to the following examples. The following examples are merely illustrative of the invention and are not intended to be limiting. Unless otherwise indicated, all percentages are by weight (w %).

FIGURES

EXAMPLES

Figure 1:
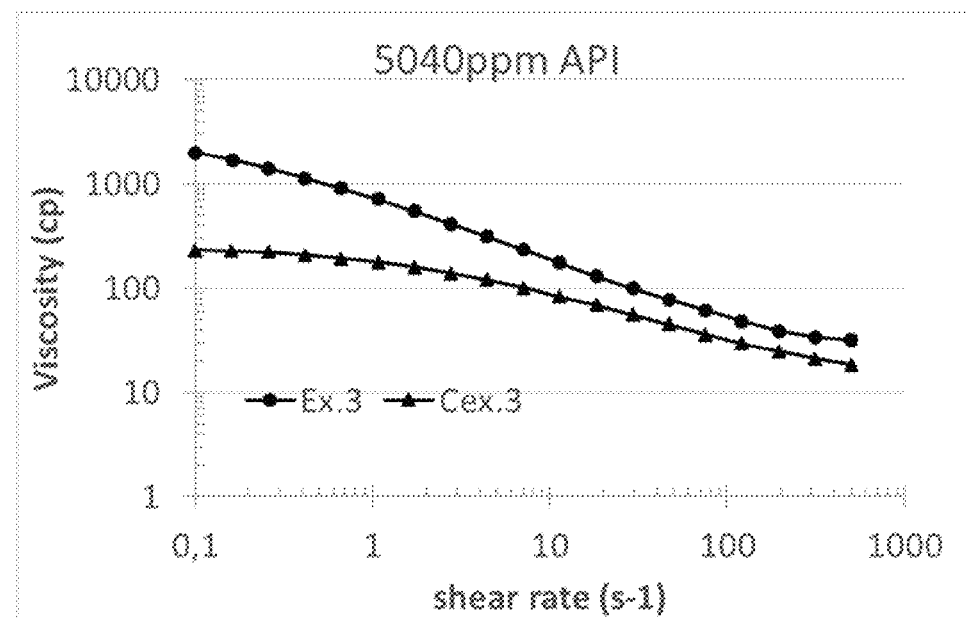
FIG. 1 is a graphic representing the Viscosity in centipoise of injection fluids prepared with Example 3 and Counter example 3, in function of the shear rate in s-1.

Inverse Emulsion Polymer A
Process for Preparing the Inverse Emulsion

In a 1000 mL beaker are added 370 grams of a 50% acrylamide solution, 89.3 grams of acrylic acid and 196.3 grams of deionised water. The pH is adjusted under stirring with a stir bar at 300 rpm to a value of 7 with a 50% solution of sodium hydroxide. 0.5 grams of Versenex 80 and 0.86 grams of a 0.7% solution of tert-butyl hydroperoxide are added to the aqueous phase. The organic phase is prepared in a reactor by adding 229 grams of Exxsol D100S and 30 grams of sorbitan mono-oleate. The aqueous phase is added to the reactor at 500 rpm using a half-moon impeller. The emulsion is formed by using a high shear mixer.

The oxygen present in the emulsion is removed by purging with nitrogen for 30 min. The temperature of the emulsion is heated and fixed at 22° C. before starting the polymerization. To initiate the polymerization, the mixture is stirred at 400 rpm and droplets of MBS are added at a rate of 0.5 mL per minute. The temperature raises and is maintained at 40° C. until a decrease of the temperature is noticed. 30 grams of nonyl phenol 9-ethoxylates is added under stirring at 30° C. to the emulsion. EM1, EM2, EM3, EM4 and EM5 are prepared by using the same synthesis protocol by adjusting the monomer compositions as presented in Table 1.

EM3, EM4 and EM5 arepolymerized such as all the polymerization steps are conducted at a pressure of 80 mbar. EM4 and EM5 are distilled inverse emulsion where the water was removed at the end of the reaction by distillation under reduced pressure. The final active content of EM4 is 53%, and of EM5 is 51%.

The active content corresponds to the total amount of polymer in weight relative to the total weight of the inverse emulsion or dewatered inverse emulsion.

TABLE 1

Chemical composition of the emulsions

| Name | Acrylamide (% mol) | Acrylic Acid (% mol) | ATBS (% mol) | Process | UL viscosity (cP) | Active matter (%) |
|---|---|---|---|---|---|---|
| EM 1 | 70 | 30 | — | — | 7.2 | 30 |
| EM 2 | 70 | 25 | 5 | — | 7.8 | 30 |
| EM 3 | 70 | 30 | 5 | Under vacuum | 7.5 | 32 |
| EM 4 | 70 | 30 | — | Under vacuum and Distilled | 7.6 | 53 |
| EM 5 | 70 | 25 | 5 | Under vacuum and Distilled | 7.4 | 51 |

UL viscosity in centipoise is measured according to the known method with a Brookfiled Viscometer at 25° C.

Solid Particles
Process for Preparing Solid Particles
a) Polymerization Step

In a 2000 mL beaker are added 738.8 g of deionised water, 641.2 g of a 50% acrylamide (AM) solution and 108.8 g of 50% solution of sodium salt of 2-acrylamido-2-methylpropane sulfonic acid (ATBS). The pH is adjusted under stirring with a stir bar at 300 rpm to a value of 7 with a 1N solution of sodium hydroxide.

Thus, the solution obtained is cooled down to between 0-5° C. and transferred to an adiabatic polymerization reaction. To eliminate any trace of oxygen, a bubbling of nitrogen is carried out for 30 min.

The compounds below are added to the reactor:
2.5 mL of 2,2'-Azobis[2-(2-imidazolin-2-yl)propane]dihydrochloride at 5 g/L
2.5 mL of hydrogen peroxyde at 1 g/L
3 mL of a solution of ammonium sulfate iron (II) hexahydrate (Mohr's salt) at 1 g/L.

After few minutes, the reactor is closed. The reaction time is between 2 to 5 hours until the maximum temperature is reached. After aging overnight, a gel of polymer is removed from the reactor and then cut into small pieces of gel having a particle size comprised between 1 to 6 mm.

b) Post Treatment Step 500 g of pieces of gel obtained in step a) are mixed to 25.3 g of 50% solution of NaOH. The preparation is maintained at 90° C. for 90 min in an oven with forced air ventilation. The final product is then cut and dried to obtain a powder with sodium carboxylate moieties (SCM).

P1 and P2 are prepared according to the polymerization process a), and the obtain pieces of gel are cut and dried to obtain a powder, wherein the monomer composition is adjusted as presented in Table 2.

P3 and P4 are prepared according to the polymerization process a), and post treatment b) to obtain a powder, wherein the monomer composition is adjusted as presented in Table 2.

TABLE 2

Chemical composition of the granulated polymer

| Fines | Composition | Ratio (% mol) | Process | UL viscosity (cP) |
|---|---|---|---|---|
| P1 | AM/AA | 70/30 | — | 6.50 |
| P2 | AM/ATBS | 75/25 | — | 5.11 |
| P3 | AM/SCM | 65/35 | Post-hydrolyzed | 8.36 |
| P4 | AM/SCM/ATBS | 75/20/5 | Post-hydrolyzed | 7.61 |

Preparation of Polymer Fines

A grinder is used to decrease the particle sizes, then a sieve is used to obtain particles below 350 μm with, and the typical particle size distribution is D (10) 82.4 am, D (50) 160 am, D (90) 273 am. Fines F1 to F4 are obtained according to said process with respective powder P1 to P4.

Preparation of Composition (Solid Particles+Inverse Emulsion)

The compositions are prepared by incorporation of the fines to the emulsion under magnetic stirring at 500 rpm for 10 min. Table 3 describes the 8 composition contents, with 5 examples according to the invention, and 3 counter-examples.

TABLE 3

Composition Contents

| Example | Composition | Ratio (EM/F) (wt. %) | Active matter (%) |
|---|---|---|---|
| CEx1 | EM1/F1 | 80/20 | 42 |
| CEx2 | EM1/F2 | 80/20 | 42 |
| CEx3 | EM1/F3 | 80/20 | 42 |
| Ex1 | EM1/F4 | 80/20 | 42 |
| Ex2 | EM2/F4 | 80/20 | 42 |
| Ex3 | EM3/F4 | 80/20 | 42 |
| Ex4 | EM4/F4 | 80/20 | 60 |
| Ex5 | EM5/F4 | 80/20 | 60 |

General Viscosity and Suspensive Effect Evaluation Procedures

Solutions of polymer, which correspond to fictive injection fluids, are prepared by adding under shear the required amount of composition of Cex 1 to 3 and Ex 1 to 5 to reach 5040 ppm of active polymer concentration into 400 mL of brine (7% NaCl, API, 2*API). The solution is then mixed for 30 minutes at 500 rpm.

Rheological properties are evaluated at 25° C. using an Anton Paar MCR302 rheometer equipped with a stainless-steel cone plate of 50 mm and 2°. Both viscosity (i) and first normal stress difference (Ni) are recorded by performing a flow curve in the 0.1-50 s$^{-1}$ shear rate range. The viscoelastic properties are evaluated on the same equipment by performing an oscillatory sweep measurement in the linear viscoelastic regime. Elastic modulus (G') and viscous modulus (G") are recorded in the 0.1-10 Hz frequency range at 10% of strain.

The rheological measurements are used to determine the following parameters:

The viscoelastic relaxation time of the fluid:

$$\tau_{osc.} = \frac{1}{2\pi \cdot f_{G'=G''}}$$

The $\lambda_{e/v}$ value $$\lambda_{e/v} = \frac{0.5 \cdot c \cdot \tau_{osc.} N_1(\dot{\gamma})}{\eta(\dot{\gamma})}$$

The theoretical settling rate at rest of sand particles (d: 0.86 mm, Δρ: 1650 kg/m3, g: 9.81 μm/s$^2$, K and n are the power-law viscosity coefficients between 100 and 400 s$^{-1}$):

$$v_p = \left(\frac{2^n g \Delta\rho}{9K}\right)^{\frac{1}{n}} \cdot d^{\frac{n+1}{n}}$$

Results

Evaluation of the Example 1 to 5 and Counter-Example 1 to 3 in API Brine

Typical example of flow curves is depicted in FIG. 1. The viscosity of example 3 is higher than the one of the counter-example 3 through the whole shear rate range. From these flow curves, the settling rate equals 11 mm/s for example 3 and 45 mm/s for counter-example 3.

The suspensive properties at rest are better for example 3 since the particles take more time to settle than counter-example 3.

Figure 2:
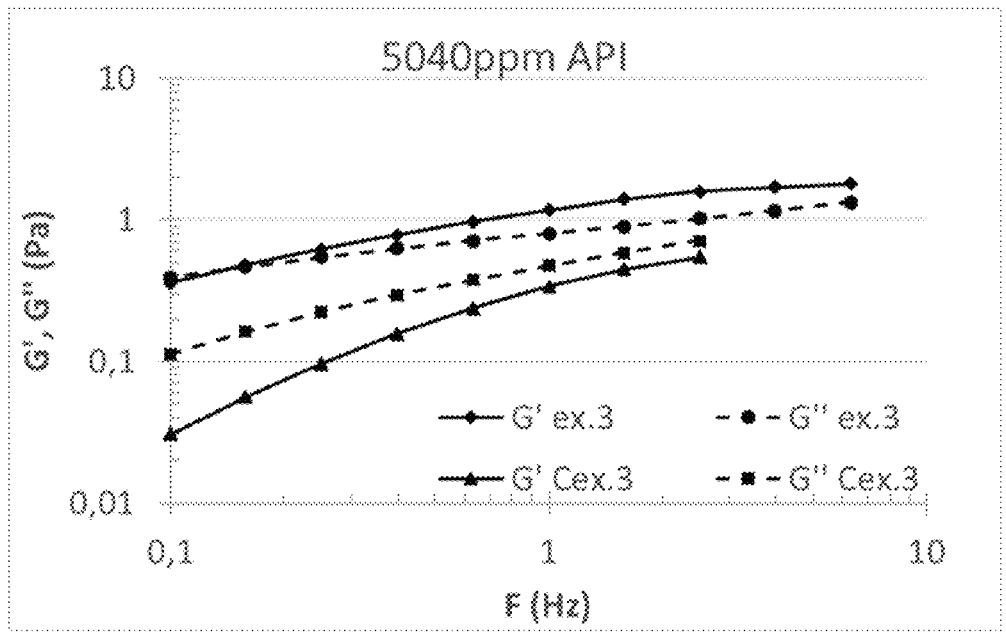
FIG. 2 is a graphic representing G' and G" of injection fluid s prepared with Example 3 and Counter example 3, in function of the Frequency in Hz.

Typical example of oscillatory measurements is depicted in FIG. 2. Both G' and G" are higher for example 3 than counter-example 3. Furthermore, the viscoelastic relaxation time is measured at 1 s for example 3 and is too fast to be measured for counter-example 3 (<0.05 s). Since a high relaxation time leads to a more elastic-like behavior, suspensive properties are better for fluids with high relaxation time.

From these flow and oscillatory measurements, the $\lambda_{e/v}$ value can be calculated at a shear rate of 500 s$^{-1}$. When $\lambda_{e/v} > 1$ the system is elastically dominated showing good suspensive properties. On the contrary when $\lambda_{e/v} < 1$ the system is viscously dominated showing poor suspensive properties. The $\lambda_{e/v}$ values are 12.8 for example 3 and below 0.1 for counter-example 3.

For the other examples and counter-examples, measurements are gathered in table 4. Viscosity, settling rate, relaxation time and $\lambda_{e/v}$ shows better suspensive properties for all examples compared to the counter-examples.

TABLE 4

Rheological measurements in API brine
Brine API

| | viscosity (cp) | | N1 (Pa) | | Settling rate (mm/s) | $\tau_{osc.}$ (s) | $\lambda_{e/v}$ (500 s-1) |
|---|---|---|---|---|---|---|---|
| Example | 100 s-1 | 500 s-1 | 100 s-1 | 500 s-1 | | | |
| Cex. 1 | 33 | 19 | 20 | 176 | 44 | <0.05 | <0.1 |
| Cex. 2 | 30 | 18 | 16 | 130 | 58 | <0.05 | <0.1 |
| Cex. 3 | 33 | 18 | 20 | 162 | 45 | <0.05 | <0.1 |
| Ex. 1 | 35 | 16 | 30 | 350 | 32 | 0.16 | 1.7 |
| Ex. 2 | 55 | 35 | 50 | 894 | 10 | 1.01 | 12.9 |
| Ex. 3 | 50 | 32 | 60 | 813 | 11 | 1.01 | 12.8 |
| Ex. 4 | 40 | 22 | 32 | 400 | 25 | 0.20 | 1.8 |
| Ex. 5 | 51 | 40 | 77 | 650 | 28 | 1.00 | 8.1 |

Evaluation of the Example 1 to 5 and Counter-Example 1 to 3 in Other Brines.

The same evaluation procedure is used in different brines 2.API and 7% NaCl. Albeit broadly different salinities are used, examples show better suspensive properties than counter-examples as shown in table 6 and 7. Table 5 described the brine composition.

TABLE 5

Brine compositions

| Brine | 1 L of deionised water | |
|---|---|---|
| | NaCl (g) | CaCl$_2$•2H$_2$O (g) |
| 7% NaCl | 70 | — |
| Sea water | 30 | 3 |
| API | 85 | 33 |
| 2 × API | 170 | 66 |

TABLE 6

Rheological measurements in 2. API brine
Brine 2. API

| Example | viscosity (cp) | | N1 (Pa) | | Settling rate (mm/s) | τ$_{osc.}$ (s) | λ$_{e/v}$ (500 s−1) |
|---|---|---|---|---|---|---|---|
| | 100 s−1 | 500 s−1 | 100 s−1 | 500 s−1 | | | |
| Cex. 1 | 30 | 18 | 2 | 125 | 64 | <0.05 | <0.1 |
| Cex. 2 | 32 | 19 | 20 | 130 | 54 | <0.05 | <0.1 |
| Cex. 3 | 25 | 17 | 20 | 378 | 81 | <0.05 | <0.1 |
| Ex. 1 | 35 | 21 | 25 | 213 | 41 | 0.25 | 1.3 |
| Ex. 2 | 55 | 39 | 50 | 781 | 13 | 0.40 | 4.0 |
| Ex. 3 | 60 | 40 | 45 | 800 | 9 | 0.64 | 6.4 |
| Ex. 4 | 45 | 26 | 10 | 188 | 26 | 0.4 | 1.4 |
| Ex. 5 | 57 | 39 | 87 | 640 | 24 | 0.27 | 2.2 |

TABLE 7

Rheological measurements in 7% NaCl brine
Brine 7% NaCl

| Example | viscosity (cp) | | N1 (Pa) | | Settling rate (mm/s) | τ$_{osc.}$ (s) | λ$_{e/v}$ (500 s−1) |
|---|---|---|---|---|---|---|---|
| | 100 s−1 | 500 s−1 | 100 s−1 | 500 s−1 | | | |
| Cex. 1 | 50 | 21 | 30 | 489 | 18 | 0.48 | 5.6 |
| Cex. 2 | 47 | 24 | 30 | 235 | 21 | 0.10 | 0.5 |
| Cex. 3 | 55 | 22 | 30 | 501 | 17 | 0.55 | 6.3 |
| Ex. 1 | 50 | 30 | 50 | 695 | 13 | 1.06 | 12.3 |
| Ex. 2 | 60 | 42 | 80 | 1455 | 6 | 2.89 | 50.1 |
| Ex. 3 | 70 | 42 | 80 | 1484 | 4 | 3.54 | 62.5 |
| Ex. 4 | 70 | 48 | 100 | 1521 | 4 | 1.59 | 25.2 |
| Ex. 5 | 80 | 36 | 81 | 1243 | 6 | 3.00 | 51.8 |

The invention claimed is:

1. A composition for preparing an injection fluid in oil and gas recovery comprising:
   i) an inverse emulsion of a water-soluble polymer A comprising acrylamide monomer units, and
   ii) solid particles of a water-soluble polymer B, and
wherein water-soluble polymer B is obtained by a polymerization step of at least acrylamide and 1 to 15 mol % of acrylamido tertiary butyl sulfonic acid (ATBS), and/or salts thereof, and a subsequent post treatment step of the resulting polymer.

2. The composition according to claim 1, wherein polymer A is different from polymer B.

3. The composition according to claim 1, wherein the first step for obtaining polymer B is the polymerization step that comprises the polymerization of at least acrylamide and at least 1 to 15 mol % of acrylamido tertiary butyl sulfonic acid (ATBS) and/or salts thereof, and at least one non-ionic monomer different from acrylamide, and/or at least one anionic monomer different from ATBS, and/or at least one cationic monomer, and/or at least one zwitterionic monomer.

4. The composition according to claim 1, wherein acrylamido tertiary butyl sulfonic acid (ATBS) is the ATBS monohydrate which is the hydrated crystalline form of ATBS having the following X-Ray powder diffraction peaks: 10.58°, 11.20, 12.65°, 13.660, 16.28°, 18.450, 20°, 20.40, 22.5°, 25.50, 25.88°, 26.470, 28.52°, 30.28°, 30.8°, 34.09°, 38.19°, 40.69°, 41.82°, 43.74°, 46.04° degrees 2-thêta (+/−0.1°).

5. The composition according to claim 1, wherein polymer B comprises between 15 and 95.9 mol % of acrylamide.

6. The composition according to claim 1, wherein the post treatment step is carried out with a Brønsted base as hydrolysis agent.

7. The composition according to claim 1, wherein polymer B is obtained according to a process that comprises successively:
   a) providing an aqueous solution of monomers comprising at least acrylamide and 1 to 15 mol % of acrylamide tertio butyl sulfonic acid (ATBS), and/or salts thereof;
   b) polymerizing said aqueous solution of monomers to obtain a gel of polymer C;
   c) cutting said gel in pieces, preferably of less than 10 cm³;
   d) realizing a post treatment step by mixing a hydrolyzing agent on said pieces of gel
   e) obtaining treated pieces of gel of polymer B at the end of the post treatment step;
   f) drying said treated pieces of gel;
   g) obtaining a powder of polymer B
   h) optionally grinding said powder;
   i) optionally sieving said powder.

8. The composition according to claim 1, wherein the rate of conversion to obtain polymer B is at least 5 mol %.

9. The composition according to claim 1, wherein polymer B comprises between 10 and 40 mol % of monomer units comprising carboxylate or carboxylic acid moieties.

10. The composition according to claim 9, wherein more than 50 mol % of the monomer units comprising carboxylate or carboxylic acid moieties, are the result of the conversion of hydrolysable functions during the post treatment step.

11. The composition according to claim 1, wherein polymer B is a polymer comprising 30 to 88 mol % of acrylamido tertiary butyl sulfonic acid (ATBS) and/or salt(s) thereof, and from 10 to 40 mol % of monomer units comprising carboxylate or carboxylic acid moieties, and wherein all the monomer units comprising carboxylate or carboxylic acid moieties are the result of the conversion of hydrolysable functions during the post treatment step.

12. The composition according to claim 1, wherein the solid particles of the water-soluble polymer B are in the form of powder, fines, granules or beads.

13. The composition according to claim 1, wherein the particles of polymer B have a particle size, before mixing with the inverse emulsion of polymer A, represented by a D50 value of between 5 μm and 500 μm.

14. The composition according to claim 1, wherein the inverse emulsion of water-soluble A is prepared according to the process comprising the following steps:
   a) preparing an aqueous phase comprising acrylamide, and optionally other water-soluble monomers,
   b) preparing an oily phase comprising at least one oil and at least one water-in-oil surfactant, c) mixing the aqueous phase and the oily phase to form a water in oil emulsion,
d) once the water in oil emulsion is formed, polymerizing under substantially oxygen free conditions the monomers of the aqueous phase with at least one free radical polymerization initiator system,
e) at the end of the polymerization, obtaining an inverse emulsion of polymer,
f) optionally, and preferably distillate said inverse emulsion;
g) optionally, post realizing a post treatment on the polymer of said inverse emulsion.

15. The composition according to claim 1, wherein the inverse emulsion of water-soluble A is obtained by polymerization carried out partially or totally at a pressure comprised between 0.1 and 200 mbar.

16. The composition according to claim 1, wherein the inverse emulsion of water-soluble A is first obtained by polymerization and is subsequently distillated to obtain a dewatered inverse emulsion.

17. The composition according to claim 1, wherein polymer A comprises at least acrylamide monomer units and at least acrylamido tertiary butyl sulfonic acid (ATBS), and/or salts thereof in an amount of 1 to 15 mol %, and at least one non-ionic monomer different from acrylamide, and/or at least one anionic monomer different from ATBS, and/or at least one cationic monomer, and/or at least one zwitterionic monomer.

18. The composition according to claim 1, wherein polymer A comprises acrylamide units in a quantity comprised between 20 and 99.9 mol %.

19. The composition according to claim 1, wherein for obtaining inverse emulsion of polymer A, a post treatment step is performed on the inverse emulsion of polymer obtained at the end of the polymerization step.

20. The composition according to claim 1, wherein the rate of conversion to obtain polymer A is at least 5 mol %.

21. The composition according to claim 1, wherein polymer A is a polymer comprising 30 to 88 mol % of acrylamide, from 2 to 12 mol % of acrylamido tertiary butyl sulfonic acid (ATBS) and/or salt(s) thereof, and from 10 to 40 mol % of acrylic acid and/or salt(s) thereof.

22. The composition according to claim 1, wherein the inverse emulsion of water-soluble A comprises from 28% to 40% by weight of water-soluble polymer A.

23. The composition according to claim 1, wherein the inverse emulsion of water-soluble polymer A comprises:
a) from 28 to 58% by weight of water-soluble polymer A;
b) from 0.8 to 3% by weight of at least two emulsifying agents;
c) from 2 to 9% by weight of at least two inverting agents;
d) from 10 to 50% by weight by weight of oil;
e) from 15 to 55% by weight by weight of water;
f) from 0 to 17% by weight of salts;
the total amount being 100% by weight;
wherein the water-soluble polymer A is a polymer comprising 30 to 88 mol % of acrylamide, from 2 to 12 mol % of acrylamido tertiary butyl sulfonic acid (ATBS) and/or salt(s) thereof, and from 10 to 40 mol % of carboxylate or carboxylic moieties, wherein the total amount of monomer is 100 mol %, and
wherein the inverse emulsion of water-soluble A is obtained by polymerization carried out partially or totally at a pressure preferably comprised between 0.1 and 200 mbar.

24. The composition according to claim 1, wherein polymer A and polymer B have an average molecular weight by weight higher than 20 million g/mol.

25. The composition according to claim 1, wherein the mass ratio between the inverse emulsion of polymer A and the solid particles of polymer B is comprised between 1:1 and 10:1.

26. An injection fluid made by mixing water or brine with the composition of claim 1, wherein, in said injection fluid, the total amount of polymer A and polymer B is comprised between 0.0005% w to 1% w.

27. A method of treating a portion of subterranean formation comprising providing the composition of claim 1, preparing an injection fluid with at least said composition, and introducing the injection fluid into a portion of the subterranean formation.

28. A fracturing method comprising providing the composition of claim 1, preparing a fracturing fluid with at least said composition and with at least a proppant, and introducing the fracturing fluid into a portion of the subterranean formation.

29. A polymer flooding method comprising providing the composition of claim 1, preparing a polymer flooding injection fluid with at least said composition, and introducing the polymer flooding injection fluid into a portion or the entire subterranean formation.

30. A method of improving the suspensive effect in an injection fluid comprising providing the composition of claim 1, preparing the injection fluid by mixing said composition in water, sea water or brine, and introducing the injection fluid into a portion or the entire subterranean formation.

* * * * *

UNITED STATES PATENT AND TRADEMARK OFFICE
CERTIFICATE OF CORRECTION

PATENT NO.         : 10,647,908 B2                                      Page 1 of 1
APPLICATION NO.    : 16/523599
DATED              : May 12, 2020
INVENTOR(S)        : Cédrick Favero It is certified that error appears in the above-identified patent and that said Letters Patent is hereby corrected as shown below:

In the Claims

Column 26, Lines 9 and 10: Claim 4, Delete "10.58°, 11.20, 12.65°, 13.660, 16.28°, 18.450, 20°, 20.40, 22.5°, 25.50, 25.88°, 26.470, 28.52°, 30.28°, 30.8°" and insert -- 10.58°, 11.2°, 12.65°, 13.66°, 16.28°, 18.45°, 20°, 20.4°, 22.5°, 25.5°, 25.88°, 26.47°, 28.52°, 30.28°, 30.8°, --

Signed and Sealed this
Eighteenth Day of August, 2020

Andrei Iancu
*Director of the United States Patent and Trademark Office*